Dec. 17, 1968     D. D. COHEN ET AL     3,416,516
BLOOD PRESSURE CUFF TRANSDUCER
Filed March 22, 1965            2 Sheets-Sheet 1
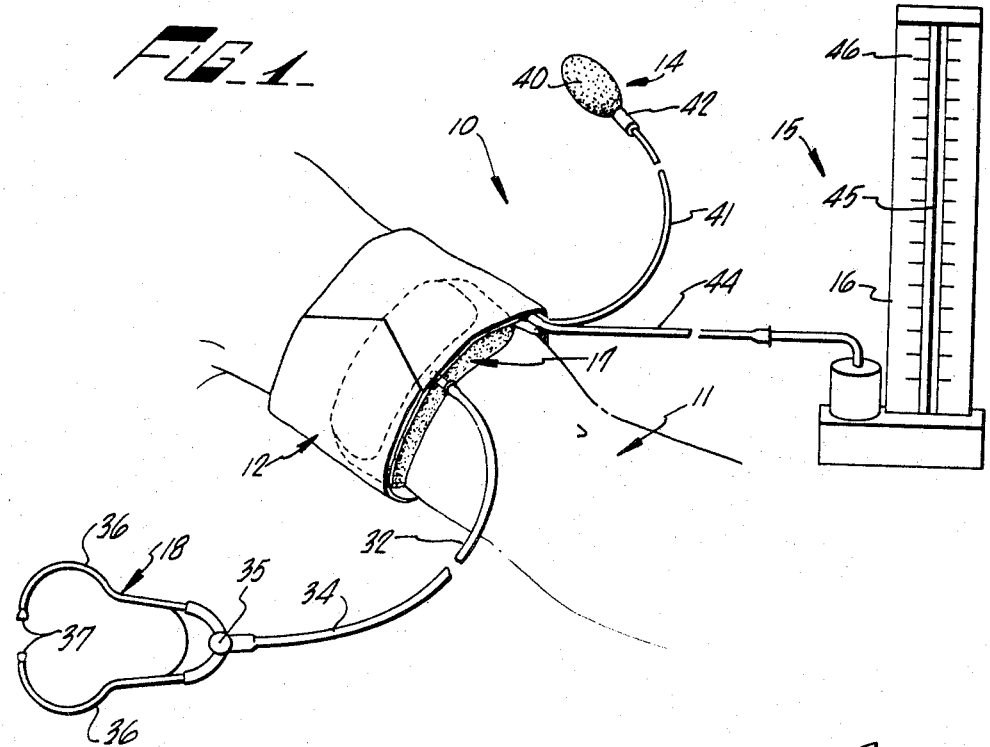
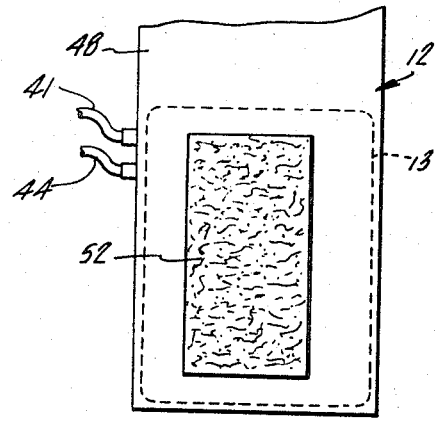
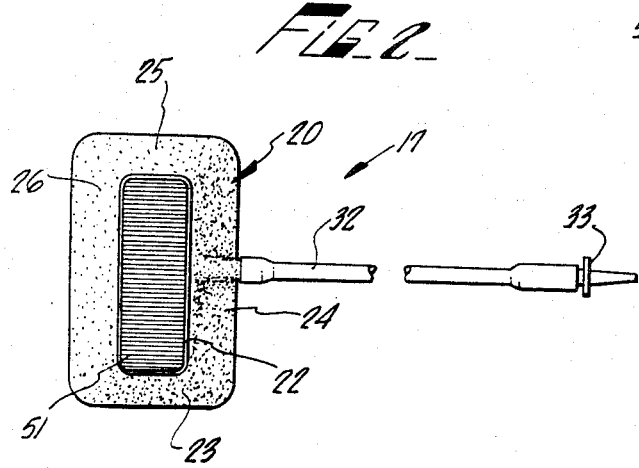
INVENTORS.
DAVID D. COHEN
ARMAND F. DuFRESNE
BY
Christie, Parker & Hale
ATTORNEYS.

Dec. 17, 1968     D. D. COHEN ET AL     3,416,516
BLOOD PRESSURE CUFF TRANSDUCER
Filed March 22, 1965     2 Sheets-Sheet 2
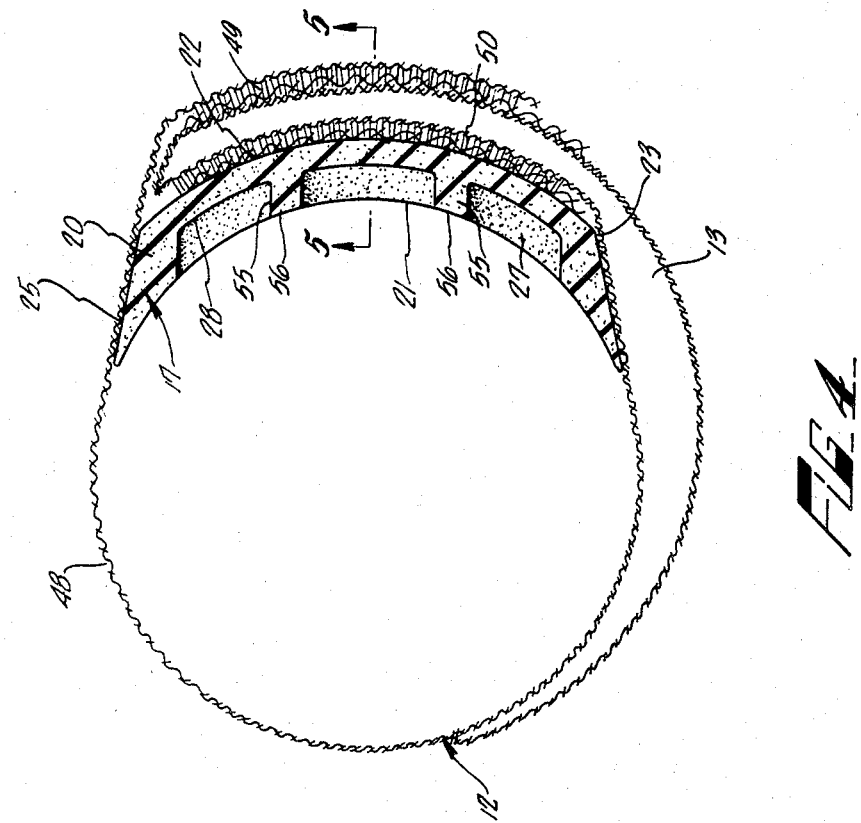
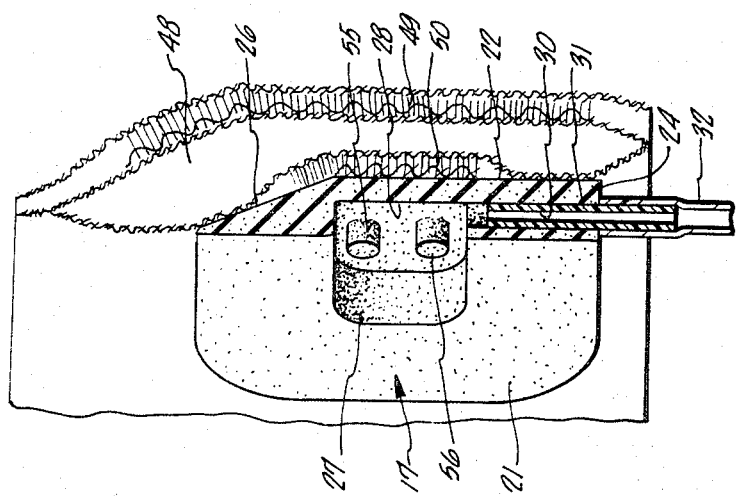
INVENTORS.
DAVID D. COHEN
BY ARMAND F. DuFRESNE
Christie, Parker & Hale
ATTORNEYS.

United States Patent Office 3,416,516
Patented Dec. 17, 1968

3,416,516
BLOOD PRESSURE CUFF TRANSDUCER
David D. Cohen, Northridge, and Armand F. Du Fresne, Duarte, Calif., assignors to Dupaco, Inc., Arcadia, Calif., a corporation of California
Filed Mar. 22, 1965, Ser. No. 441,572
13 Claims. (Cl. 128—2.05)

ABSTRACT OF THE DISCLOSURE

A stethoscope audio pickup transducer for use in ausculatory measurements of blood pressure comprising a pliable and flexible member having a substantially cylindrical surface, concave exterior surface and a cavity extending within the member adjacent a substantial portion of the concave surface. The cavity is effectively open for the purposes of sound transmission to the concave surface over a substantial portion of its boundary proximate to the concave surface. A passage extends from the cavity to a surface of the member other than the concave surface and is adapted at its end spaced from the cavity for sound transmitting connection to a stethoscope earpiece.

---

This invention relates to blood pressure measurement, and, more particularly, to an improved stethoscope audio pickup unit which is especially adapted for use during blood pressure measurements.

The proper measurement of blood pressure requires that readings be obtained of the systolic and diastolic blood pressures. Systolic pressure is the greatest or peak pressure of the blood in an artery during a heartbeat. Diastolic pressure is the pressure of the blood in the artery between heartbeats. In a normal person, diastolic blood pressure does not vary appreciably.

Commonly, measurements of arterial blood pressure are obtained by the use of a pneumatic cuff encircling a patient's arm, for example, and to which is coupled a device, such as an aneroid barometer having a dial pointer or a mercury barometer, i.e., an aneroid or mercurial sphygmomanometer, for measuring the pressure of the air in an inflatable bladder in the cuff. The bladder is inflated until the air pressure in the bladder is around 300 mm. Hg, or some other pressure in excess of the systolic pressure of the patient, so that the artery at a location centrally of the cuff is completely constricted or occluded. The bladder pressure is then reduced until the aneroid pointer or the mercury column begins to bounce—the bladder pressure at this point is often regarded as the same as the systolic pressure. There is no reliable diastolic reading with this method.

Blood pressure measurements obtained by practice of the above-outlined process are not accurate. The American Heart Association (see Committee on Standardization of Blood Pressure Reading, American Heart Journal, 18:95 (July 1939) recommends that a stethoscope be used in combination with the above-outlined process to monitor Korotkow's sounds, the sounds which blood makes when passing through a constricted artery. When properly applied, the stethoscope audio pickup is placed over the artery centrally of the cuff. One familiar with the nature of Korotkow's sounds can obtain more accurate readings of blood pressure than when the cuff and pressure monitor alone are used. Proper placement of the stethoscope pickup is difficult to obtain in many cases, and is even harder to maintain. Stethoscopes are now available, however, which partially overcome these problems by the use of a strap to which the pickup is connected and which encircles the arm under the pneumatic cuff. The principal problem with such devices is that the strap may be too tight thereby producing a falsely high diastolic reading, or it may be too loose allowing the pickup to move on the arm as the cuff is applied or thereafter.

This invention provides a novel stethoscope pickup which overcomes the above-mentioned problems. The pickup, also describable as a blood pressure cuff transducer, is simple and easy to use in that it can be centered near the artery, rather than squarely over the artery, and still produce clearly audible sounds. Moreover, the pickup can be used repeatedly over a long period of time, as in surgery when the patient is under anesthesia or when the patient is undergoing intensive care, without traumatic effect to the patient.

Generally speaking, this invention provides a stethoscope pickup transducer comprising a pliable and flexible member defining a concave exterior surface and a cavity in the member. A passage extends through a wall of the member from the cavity to an exterior surface of the member. The surface to which the passage extends is a surface other than the concave surface. A hollow duct is coupled to the end of the passage opposite from the cavity. The other end of the duct carries a fitting adapted to be connected to an earpiece such as a stethoscope earpiece.

The above-mentioned and other features of the invention are more fully set forth in the following description of a presently preferred embodiment of the invention, which description is presented in conjunction with the accompanying drawings, wherein:

FIG. 1 is a perspective view of a presently preferred stethoscope pickup transducer according to this invention engaged between a human arm and a pneumatic blood pressure cuff;

FIG. 2 is a top plan view of the transducer shown in FIG 1;

FIG. 3 is a bottom plan view of the portion of the cuff shown in FIG. 1 which overlies the transducer in FIG. 1;

FIG. 4 is an enlarged cross-sectional elevation view of the transducer and the cuff engaged as shown in FIG. 1; and FIG. 5 is a cross-sectional elevation view taken along line 5—5 in FIG. 4.

FIG. 1 shows a blood pressure measuring system 10 according to this invention; the system is illustrated as it is used to measure blood pressure in an artery in a patient's arm 11. The system includes a conventional pneumatic cuff 12 incorporating an inflatable bladder 13 (see FIG. 4), a bulb pump 14 for inflating the bladder, and a bladder pressure monitor 15 which, in the form illustrated, is a mercury barometer 16. The system also includes a blood pressure cuff transducer or stethoscope pickup 17, more fully described hereafter, disposed between the cuff and the patient's arm. The transducer is connected to a stethoscope earpiece unit 18 so that the sounds which the blood makes in passing through a constricted artery, such as the brachial artery in the patient's arm, can be heard by a person wearing the stethoscope earpiece unit.

FIGURES 2, 3, 4, and 5 illustrate transducer 17 and its relationship to cuff 12. As shown best in FIGURES 4 and 5, the transducer comprises a unitary molded member 20 which preferably is fabricated from rubber so that the member is pliable and flexible. The member is arcuately curved to define substantially parallel concave and convex exterior surfaces 21 and 22, respectively. The member is of generally cylindrical configuration and is longer in a direction normal to the axis of curvature of surfaces 21 and 22 than it is in a direction parallel to the axis of curvature of the surfaces; FIGS. 4 and 5 illustrate the member in longitudinal and vertical cross-section, respectively. The member also has side surfaces 23, 24, 25, and 26. The member is elongated in the direction of curvature of the concave and convex surfaces. A cavity 27 which opens to concave surface 21 is formed in the member. The cavity is disposed centrally of the member and is elongated in the direction of the elongate extent of the member. Preferably, as shown in FIGURES 4 and 5, the cavity opens to concave surface 21 along one entire side of the cavity. The cavity, however, is shorter and narrower than the member in which the cavity is formed. The cavity has a base surface 28 disposed substantially parallel to the concave and convex surfaces of the member. Preferably, exterior surfaces 23–26 are inclined from the concave surface to the convex surface so that the convex surface has an area less than the area of the concave surface.

A passage 30 extends laterally of the cavity substantially parallel to the concave and convex surfaces of the member to longitudinal side surface 24. A tube 31, preferably fabricated of metal or plastic, is engaged in the passage and extends a short distance laterally away from the member as shown in FIG. 5. One end of a duct 32, preferably defined by a length of flexible plastic tubing or the like, is engaged circumferentially of the tube so as to be coupled to the end of passage 30 opposite from cavity 27. The other end of duct 32 carries a fitting 33 configured and arranged so that duct 32 may be coupled to a stethoscope earpiece. Preferably, fitting 33 is a male Luer fitting.

The stethoscope earpiece unit illustrated in FIG. 1 is a conventional yoke-type earpiece wherein a single sound transmitting duct 34 (to which fitting 33 is connected when the earpiece is coupled to transducer 17) is coupled to the stem of a T fitting 35. A pair of similarly configured metal ducts 36 are coupled to the arms of the T fitting. The ducts open to earplugs 37 at their ends opposite from the T fitting. Duct 34 conventionally is coupled to a button-type stethoscope pickup (not shown) so that sound is transmitted from the pickup through duct 34 and tubes 36 to the earplugs. As used herein, however, the term "stethoscope earpiece unit" also encompasses an earpiece of the type comprising a single earplug molded to the configuration of a particular person's ear and coupled to a length of plastic tubing. Such single earplug stethoscope earpieces are connected to a suitable stethoscope pickup when the person wearing the earpiece desires to listen to a body sound.

As illustrated in FIG. 1, pneumatic cuff 12 is equipped with a hand operated air pump 14 including a bulb 40 coupled to cuff bladder 13 by a flexible tube 41. The pump structure is known and, therefore, is not illustrated in detail. The pump, however, is constructed so that the manually engageable bulb may be moved axially of a fitting 42 which couples the bulb to duct 41. When the bulb is moved in the fitting toward the duct, bladder 13 is inflated as the bulb is squeezed. On the other hand, when the bulb is moved away from the duct in fitting 42, an air vent through the duct is opened so that air pressure in the bladder can be vented to the atmosphere. The air vent is positioned in the coupling so that an anesthesiologist or other person using the cuff can regulate the passage of air through the vent by placing his thumb over the outer opening of the vent. Such a fitting as that described is manufactured by David Clark Co., Inc., Worcester, Mass. Accordingly, it will be seen that the bladder has coupled to it means for inflating the bladder with air and for controllably reducing the bladder air pressure.

Bladder 13 is also coupled by a duct 44 to the input of a mercury barometer 16 which visibly indicates the pressure of the air in the bladder by the height of a column of mercury in a vertical transparent tube 45. A scale 46, calibrated in millimeters of mercury, is mounted adjacent tube 45 so that the height of the mercury column in the tube can be translated into specific values of air pressure.

Cuff 12 preferably is fabricated from an elongated strip 48 of flexible material. Bladder 13 is mounted to one end of the strip and extends partially along the strip, as shown in FIG. 3. The strip is provided with means for securing its opposite ends together so that the strip can be secured in encircling relation to the arm or other appendage of a patient; in the cuff illustrated in FIGS. 4 and 5, a Velcro fastener 48 is used to accomplish this function. A Velcro fastener comprises a piece of pile material and a multitude of small barbs secured to a fabric backing. The pile material is connected to one end of strip 48, preferably in overlying relationship to at least a portion of bladder 13, and the barb-carrying fabric is mounted to the opposite side of the strip at its other end. Such a fastener can be reused an almost infinite number of times and is extremely versatile in its operation. Such a fastener is manufactured by American Velcro Co., Manchester, N.H.

In the presently preferred embodiment of the invention illustrated in the accompanying drawings, a Velcro fastener 50, or some other suitable fastener, is provided for removably coupling transducer 17 to pneumatic cuff 12. As illustrated in FIG. 2, a length of Velcro hook material 51 is secured to convex surface 22 of transducer 17 over substantially the entire length of the surface. A strip of Velcro pile material 52 is secured to cuff 12 and extends along the cuff in the direction of the elongate extent of strip 48. Material 52 is positioned on the cuff within the length of bladder 13.

FIG. 1 illustrates the use of transducer 17 in the measurement of systolic and diastolic blood pressure. The transducer is disposed in contact with the skin of an appendage of the patient whose blood pressure is to be monitored. While the transducer is shown in FIG. 1 as engaged with a human arm, devices according to this invention have been used successfully to measure arterial blood pressure in a leg. It is noted that the transducer can be used to measure the blood pressure of animals. The transducer is positioned so that the elongate extent of the transducer extends around the appendage. The transducer is so positioned that cavity 27 overlies the artery in which blood pressure is to be measured. The cuff is then applied to the appendage so that the bladder overlies the transducer. It is preferred that the transducer be applied to the cuff before the cuff is applied to the arm; if this is done, then the transducer is positioned as the cuff is applied. After the cuff is applied, the bladder is inflated to some pressure above the expected systolic pressure to be measured. If the blood pressure of this particular patient has not been taken for some time, conventionally the bladder is inflated so that the air therein is at about 300 millimeters of mercury. At such a pressure, because of the pliability and flexibility of unitary molded member 20, the member conforms to the contour of the arm. The conformance of the molded member to the patient's arm in response to inflation of the bladder is further facilitated by the bevelled peripheral edge configuration of the member. In order that cavity 27, however, will not be collapsed as the bladder is inflated, a plurality of projections 55 are molded integral with member 20 and extend from cavity surface 28 across the cavity to ends 56 lying in the surface defined by concave surface 21 (see FIG. 4), for example. A plurality of interconnected cavities may be provided, if desired. Duct 32 is connected to a stethoscope earpiece.

The initial inflation of the bladder to a pressure greater than the systolic arterial pressure causes the artery over which the transducer is placed to become completely constricted. The person using the apparatus of system 10 then bleds air from the bladder until Phase 1 sounds of Korotkow are first heard (see "Sphygmomanometry: The Indirect Measurement of Blood Pressure," by Collins and McGorra, Anesthesia and Analgesia 42:443, July-August 1963). When these sounds are first heard, the value given by scale 45 for the mean height of the oscillating column of mercury in tube 45 is taken as the systolic pressure. Once the systolic pressure value has been obtained, the pressure in the bladder is further reduced at the desired rate until no further sounds are heard. At the point at which Korotkow's sounds are no longer heard, the height of the column of mercury is referred to to obtain the diastolic pressure value.

It was noted above that member 20 preferably is fabricated from molded rubber. It is within the scope of this invention that a sponge material, such as foamed neoprene rubber, having a hard surface may be used if desired. Regardless of the nature of the material used in fabricating the member, the material should produce a flexible and pliable article so that the transducer can be caused to conform to the shape of the patient's arm. The transducer should not be fabricated from a material which has a sound deadening characteristic. It is for this reason that molded rubber is preferred in the construction of the transducer. Preferably, the rubber has a hardness of from 30 to 70 Shore, and a rubber having a hardness of 30 Shore is presently particularly preferred for a transducer according to this invention.

It was stated above that the use of a transducer according to this invention overcomes many, if not all, of the problems attendant to the use of conventional stethoscope pickups in combination with a pneumatic cuff. Conventional stethoscope pickups are fabricated either from a hard plastic or from metal. From the foregoing description, it is apparent that the pressures involved in the use of a pneumatic cuff are substantial. Further, as noted above, adherence to recommended procedures requires that the stethoscope pickup be placed directly between the arm and the cuff. The conventional stethoscope pickup, therefore, is forcibly engaged with the arm of a patient. When blood pressure readings are taken at frequent intervals over a long period of time, as is the case during an operation wherein the patient is under general anesthesia or when the patient is undergoing intensive care, such forcible engagement of a conventional stethoscope pickup with the patient's arm can have traumatic results. It is not uncommon for a patient to complain for several days of a pain in his arm caused by a conventional stethoscope pickup. Because the transducer provided by this invention is flexible and pliable, such traumatic effects are avoided. Morever, no encircling straps, other than cuff 12, is required to secure the transducer in position. Thus the problems produced by overly tight securing straps are avoided.

The proper use of a conventional stethoscope pickup in obtaining blood pressure readings requires precise placement of the pickup. If the pickup is placed too high on the artery relative to the arterial constriction, then falsely high systolic readings will be obtained since, as the pressure in the bladder of the pneumatic cuff is reduced to a pressure slightly above the actual systolic pressure, reverberations in the artery, caused by blood beating against the constriction, will be heard. If the conventional stethoscope pickup is placed too far below the arterial constriction, then a falsely low systolic reading will be obtained. A falsely high diastolic value will also be obtained when the stethoscope pickup is too far below the arterial constriction. The diastolic reading is particularly important since it is only during diastole that the heart is nourished. Angular misalignment of the conventional pickup results in diminution of the audible signal.

It has been found that the placement of transducer 17 is not critical to the accurate measurement of systolic and diastolic pressures. Preferably, the transducer is positioned so that cavity 27 is centered over the axis of the artery below the arterial constriction. However, in a series of tests made upon the arm of a healthy, well-fleshed person, the transducer was deliberately positioned angularly out of alignment with the arterial axis. It was found that substantially identical values of systolic and diastolic pressure were obtained when the transducer was placed directly over the axis of the brachial artery, when the transducer was displaced 45° anteriorly and 45° posteriorly of the arterial axis. In these cases and in cases where the displacement of the transducer from its optimum position, Phase 1 and Phase 4 sounds of Korotkow were clearly audible.

There has been described above a novel stethoscope pickup for use as a blood pressure cuff transducer which is simple in construction, effective in use, and easy to place properly. The transducer overcomes the disadvantages and problems engendered in the use of conventional stethoscope pickups to obtain blood pressure readings. Moreover, the transducer can be used without adverse effect on the arm or other appendage of a patient.

While the invention has been described above in conjunction with specific apparatus and configurations thereof, this has been merely by way of setting forth the invention in a presently preferred embodiment thereof. Those skilled in the art will appreciate that modifications and alterations may be made to the above-described apparatus without departing from the scope of this invention, and, therefore, the foregoing description is not to be considered as limiting the scope of this invention.

What is claimed is:

1. A stethoscope audio pickup transducer for use in ausculatory indirect measurement of blood pressure and the like; comprising a pliable and flexible member defining a substantially cylindrical concave surface and a cavity therein extending in the member adjacent a substantial portion of the concave surface and effectively open to said concave surface over a substantial portion of are area of the cavity boundary proximate to said surface for transmission of sound from said surface to the cavity, the member also defining a passage therethrough from the cavity to a side surface of the member, and means coupled to the passage at the end of the passage spaced from the cavity and adapted for connection to an earpiece for the transmission of sound from the cavity to the earpiece.

2. A stethoscope audio pickup transducer for use in ausculatory indirect measurement of blood pressure and the like comprising a pliable and flexible member defining a substantially cylindrical concave surface and a cavity therein extending in the member adjacent a substantial portion of the concave surface and effectively open to said concave surface over a substantial portion of the area of the cavity boundary proximate to said surface for transmission of sound from said surface to the cavity, the member also defining a passage therethrough from the cavity to an exterior surface of the member other than the concave surface and an exterior surface opposite from the concave surface, a duct coupled to the passage at the end thereof spaced from the cavity and extending from the member, and means adapted for coupling the duct to an earpiece carried by the duct at the end thereof spaced from the member.

3. A stethoscope audio pickup transducer for use in ausculatory indirect measurement of blood pressure and the like comprising a pliable and flexible member having a substantially cylindrical concave surface and elongated in the direction of curvature of the concave surface, the member defining a cavity centrally therein elongated in the direction of the elongate extent of the member and being open to the concave surface over a substantial portion of the elongate area of the cavity, the member also defining a passage therethrough from the cavity to an exterior surface of the member other than the concave surface, and means coupled to the member at the end of the passage opposite from the cavity adapted for connection to an earpiece for the transmission of sound from the cavity to the earpiece.

4. A stethoscope audio pickup transducer for use in ausculatory indirect measurement of blood pressure and the like comprising a unitary pliable and flexible member having substantially cylindrical concave and convex exterior surfaces arranged substantially parallel to one another, the member being elongated in the direction of curvature of the concave and convex surfaces and defining therein a cavity which is elongated in the direction of the elongate extent of the member, the cavity being open to the concave surface over a substantial portion of the elongate area of the cavity, the member having peripheral exterior surfaces inclined from the convex surface to the concave surface so that the convex surface has less area than the concave surface, the member defining a passage extending from the cavity to a peripheral exterior surface.

5. A transducer according to claim 4 wherein the passage opens to a peripheral exterior surface which extends along the elongate extent of the member.

6. A stethoscope audio pickup transducer comprising a unitary pliable and flexible member having substantially cylindrical concave and convex exterior surfaces arranged substantially parallel to one another, the member being elongated in the direction of curvature of the concave and convex surfaces and defining a cavity centrally therein elongated in the direction of the elongate extent of the member and open to the concave surface along the entire boundary thereof proximate to the concave surface, the member having peripheral exterior surfaces inclined from the convex surface to the concave surface so that the convex surface has an area less than the area of the concave surface, the member defining a passage extending laterally through the member from the cavity to a peripheral exterior surface.

7. A stethoscope audio pickup transducer for use in auscultatory indirect measurement of blood pressure and the like comprising a unitary pliable and flexible molded member having substantially cylindrical concave and convex exterior surfaces disposed substantially parallel to one another, the member being elongated in the direction of curvature of the concave and convex surfaces, and defining centrally therein a cavity elongated in the direction of the elongate extent of the member and open along one entire principle boundary thereof to the concave surface, the member having peripheral exterior surfaces inclined from the convex surface to the concave surface so that the convex surface has an area less than the concave surface, the member defining a passage extending from the cavity to one of the peripheral exterior surfaces and a projection extending from the surface of the cavity opposite the concave surface across the cavity to an end lying substantially in the concave surface for maintaining the identity of the cavity in use when pressed against an arm, for example, over the brachial artery as by a sphygmomanometric cuff.

8. A transducer according to claim 7 wherein the member is fabricated of rubber having a hardness in the range of from 30 to 70 Shore, inclusive.

9. A transducer according to claim 8 wherein the rubber has a hardness of about 30 Shore.

10. A pneumatic blood pressure cuff for use in measuring the blood pressure of a patient and comprising an elongate strip of flexible material configured and adapted for encircling an appendage of the patient, an inflatable bladder mounted to the strip and extending partially therealong, means coupled to the bladder for inflating the bladder with air to a predetermined pressure and for controllably reducing the pressure of air in the bladder, means coupled to the bladder adapted for coupling the bladder to means for monitoring the bladder air pressure, a unitary pliable and flexible member defining a concave surface and a cavity therein adjacent the concave surface and effectively open to the concave surface over a substantial portion of the area of the cavity proximate the concave surface for transmission of sound from the concave surface to the cavity, the member also defining a passage therethrough from the cavity to an exterior surface of the member other than the concave surface, a duct coupled to the passage at the end thereof spaced from the cavity and extending from the member, means carried by the duct at the end thereof spaced from the member adapted for connection to a stethoscope earpiece, and means for releasably mounting the flexible member to the strip so that when the member is mounted to the strip the strip engages the exterior surface of the member opposite from the concave surface and so that the bladder overlies the member.

11. A pneumatic blood pressure cuff for use in measuring the blood pressure of a patient and comprising an elongate strip of flexible material configured and adapted for encircling an appendage of the patient, an inflatable bladder mounted to the strip and extending partially therealong, means coupled to the bladder for inflating the bladder with air to a predetermined pressure and for controllably reducing the pressure in the bladder, means coupled to the bladder for coupling the bladder to means for monitoring the bladder air pressure, a unitary pliable and flexible member defining a concave surface and a cavity therein opening to the concave surface, the member also defining a passage therethrough from the cavity to an exterior surface of the member other than the concave surface and an exterior surface opposite from the concave surface, a duct coupled to the passage at the end thereof spaced from the cavity and extending from the member, means carried by the duct at the end thereof spaced from the member adapted for connection to a stethoscope earpiece, and means for releasably mounting the flexible member to the strip so that when the member is mounted to the strip the strip engages the exterior surface of the member opposite from the concave surface and so that the bladder overlies the member.

12. Apparatus for measuring the systolic and diastolic pressures in blood flowing through an artery in an appendage comprising an elongate piece of flexible material having a length at least as great as the circumference of an appendage in which blood pressure is to be measured, means for securing the piece of material in encircling relation to the appendage, an inflatable bladder mounted to the piece of material and extending partially therealong, means coupled to the bladder for inflating the bladder with air to a selected pressure and for controllably releasing air from the bladder, visually observable means operatively coupled to the bladder for monitoring the pressure of air in the bladder, a unitary pliable and flexible molded member having opposite substantially parallel concave and convex exterior surfaces, the member being elongated in the direction of curvature of the concave and convex surfaces, the member defining an elongate cavity centrally therein extending along the elongate extent of the member for a distance less than the length of the member and opening to the concave surface along the entire extent of an elongate side of the cavity, the member also defining a passage therethrough from the cavity to an exterior surface of the member other than the convex and concave surfaces, the member having peripheral exterior surfaces bevelled from the convex surface to the convex surface, an air duct coupled to the passage at the end threof spaced from the cavity and extending from the member, stethoscope earpiece means coupled to the duct at the end thereof spaced from the member, and means for releasably connecting the member to the piece of material so that the concave surface of the member is opposite from the piece of material and the bladder overlies the member.

13. A stethoscope audio pickup transducer for use in auscultatory indirect measurement of blood and the like comprising a pliable and flexible member defining a substantially cylindrical concave surface and a cavity therein extending in the member adjacent a substantial portion of the concave surface and effectively open to said concave surface over a substantial portion of the area of the cavity boundary proximate to said surfaces for transmission of sound from said surface to the cavity, and signal transmission means coupled from the cavity to an exterior surface of the member other than the concave surface for transmitting manifestations of sound from the cavity through the member and adapted adjacent said other exterior surface for connection to a stethoscope earpiece, for example.

References Cited
UNITED STATES PATENTS

| | | | |
|---|---|---|---|
| 1,089,122 | 3/1914 | Faught et al. | 128—2.05 |
| 2,193,945 | 3/1940 | Strauss et al. | 128—2.05 |
| 2,571,124 | 8/1951 | Farrand | 128—2.05 |
| 3,160,708 | 12/1964 | Andries et al. | 179—1 |

WILLIAM E. KAMM, *Primary Examiner.*

U.S. Cl. X.R.

179—107; 181—24